United States Patent
Bengoa et al.

(10) Patent No.: US 11,379,439 B1
(45) Date of Patent: Jul. 5, 2022

(54) INCREMENTAL TRANSFER OF DATABASE SEGMENTS

(71) Applicant: Datometry, Inc., San Francisco, CA (US)

(72) Inventors: Alberto Bengoa, Sunnyvale, CA (US); Michael Alexander Duller, San Francisco, CA (US); Deepak Patel, Fremont, CA (US); Dmitri Korablev, San Francisco, CA (US); Florian Michael Waas, San Francisco, CA (US)

(73) Assignee: DATOMETRY, INC., San Francisco, CA (US)

( * ) Notice: Subject to any disclaimer, the term of this patent is extended or adjusted under 35 U.S.C. 154(b) by 0 days.

(21) Appl. No.: 16/857,098

(22) Filed: Apr. 23, 2020

Related U.S. Application Data

(60) Provisional application No. 62/847,295, filed on May 13, 2019.

(51) Int. Cl.
*G06F 16/21* (2019.01)
*G06F 16/23* (2019.01)
*G06F 16/22* (2019.01)

(52) U.S. Cl.
CPC ........ *G06F 16/214* (2019.01); *G06F 16/2282* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 5,970,502 A | 10/1999 | Salkewicz et al. | |
| 6,609,128 B1* | 8/2003 | Underwood | G06F 9/454 |
| | | | 707/610 |
| 6,633,878 B1* | 10/2003 | Underwood | G06Q 10/10 |
| 8,611,617 B1* | 12/2013 | Baluja | G06K 9/6292 |
| | | | 382/124 |
| 9,715,434 B1* | 7/2017 | Xu | G06F 11/1453 |
| 10,303,390 B1* | 5/2019 | Colgrove | G06F 3/0625 |

(Continued)

OTHER PUBLICATIONS

Non-Published Commonly Owned Related U.S. Appl. No. 16/857,097 with similar specification, filed Apr. 23, 2020, 46 pages, Datometry, Inc.

*Primary Examiner* — Wilson Lee
(74) *Attorney, Agent, or Firm* — Adeli LLP

(57) ABSTRACT

Some embodiments provide a method for migrating data from a first database to a second database. The data is susceptible to change at the first database before all of the data is migrated to the second database and is available for access through the second database. The method transfers segments of data incrementally from the first database to the second database and generates a first digital signature for each transferred segment. The method identifies a set of transferred segments that have been modified in the first database before the data is available for access through the second database by generating a second digital signature for each transferred segment in the set and comparing the second digital signature for the segments with the first digital signature for the segments. The method transfers the modified segments from the first database to the second database in order to replace the previously transferred segments.

15 Claims, 12 Drawing Sheets

(56) References Cited

U.S. PATENT DOCUMENTS

| | | |
|---|---|---|
| 2007/0143564 A1 | 6/2007 | Uppala |
| 2007/0261112 A1* | 11/2007 | Todd ................... G06F 21/577 |
| | | 726/11 |
| 2008/0005086 A1* | 1/2008 | Moore ................. G06F 16/955 |
| 2008/0248779 A1* | 10/2008 | Tsui ........................ H02J 7/32 |
| | | 455/408 |
| 2009/0210932 A1* | 8/2009 | Balakrishnan .......... H04W 4/02 |
| | | 726/5 |
| 2012/0084270 A1* | 4/2012 | Jayaraman ............ G06F 3/0608 |
| | | 707/692 |
| 2014/0281306 A1* | 9/2014 | Nakajima ............. G06F 3/0683 |
| | | 711/162 |
| 2015/0095384 A1 | 4/2015 | Antony et al. |
| 2015/0378962 A1 | 12/2015 | Golovashkin et al. |
| 2016/0350392 A1 | 12/2016 | Rice et al. |
| 2017/0011104 A1 | 1/2017 | Hyde et al. |
| 2017/0039232 A1 | 2/2017 | Jayanth et al. |
| 2017/0083566 A1 | 3/2017 | Das et al. |
| 2017/0147447 A1* | 5/2017 | Nagarkar ............ G06F 11/1453 |
| 2019/0213175 A1 | 7/2019 | Kong et al. |
| 2019/0311057 A1 | 10/2019 | Sung et al. |
| 2020/0125582 A1 | 4/2020 | O'Shaughnessy |
| 2020/0167323 A1 | 5/2020 | Swamy et al. |

\* cited by examiner

0405

| Col A | Col B | Col C |
|---|---|---|
| 1 | x1 | y1 |
| 1 | x2 | y2 |
| 1 | x3 | y3 |
| 1 | x4 | y4 |
| 2 | x5 | y10 |
| 2 | x6 | y6 |
| 2 | x7 | y7 |
| 4 | x8 | y8 |
| 4 | x9 | y9 |

Time t_y

⇑

0405

| Col A | Col B | Col C |
|---|---|---|
| 1 | x1 | y1 |
| 1 | x2 | y2 |
| 1 | x3 | y3 |
| 1 | x4 | y4 |
| 2 | x5 | y5 |
| 2 | x6 | y6 |
| 2 | x7 | y7 |
| 4 | x8 | y8 |
| 4 | x9 | y9 |

Time t_x

*Figure 7*

| Table Name | Segmentation Column(s) | Avg. Block Size |
|---|---|---|
| T1 | A, B | 300 MB |
| T2 | C | 100 MB |
| T3 | User_ID mod 75 | 300 MB |
| T4 | First 4 characters of D | 2 GB |
| T5 | new.random.int0-99 | 750 MB |

*Figure 9*

| Col A | Col B | Col C | Col D |
|---|---|---|---|
| 1 | M | x1 | y1 |
| 1 | M | x2 | y2 |
| 1 | L | x3 | y3 |
| 1 | L | x4 | y4 |
| 2 | L | x5 | y5 |
| 2 | L | x6 | y6 |
| 2 | M | x7 | y7 |
| 2 | M | x8 | y8 |
| 2 | M | x9 | y9 |

Col A, Col B: Segmentation Columns

INCREMENTAL TRANSFER OF DATABASE SEGMENTS

BACKGROUND

The advantages of modern data-warehouse-as-a-service (DWaaS) systems have motivated many companies to migrate from on-premises warehouse systems (e.g., Teradata or Oracle) to cloud-native systems (e.g., Microsoft Azure SQL Data Warehouse or Amazon Redshift). However, the migration process can be difficult due to the amount of data that needs to be transferred and the inability for many companies to have downtime for their databases. For example, over a conventional network, it may take 3 months to migrate an entire enterprise database to the cloud—but companies will generally want downtime to be capped at 1-3 days. Though the on-premises database can be accessed during the migration, churn will be such that a large chunk of the migrated database will no longer be accurate after the data transfer.

BRIEF SUMMARY

Some embodiments of the invention provide a novel method for migrating data from a first source database (or other formatted data storage) to a second target database (or other similarly formatted data storage), where the data is susceptible to change at the source database before all of the data is transferred to the target database and the target database is fully accessible (thereby replacing the source database for active use). Specifically, some embodiments divide the source database into segments and transfer these segments incrementally, then iteratively check the source database to determine whether any segments have been modified and transfer these modified segments to the target database to replace the corresponding segments previously transferred to the target database.

To determine whether segments have been changed, some embodiments generate a digital signature for each segment of the source database and store this information in a separate table along with indicators for each of the segments. The signatures are generated in such a way that any change in the digital signature is indicative of a change in the segment, and any change in the segment will cause a change in the digital signature. For instance, some embodiments generate a hash value of the segment or use a similarly deterministic algorithm based on the data in the segment.

At each iteration, the method of some embodiments generates new digital signatures for each of the segments (or at least a subset of the segments being checked at the specific iteration) and compares these new digital signatures to the stored signatures. Each digital signature that is different from the corresponding stored signature is indicative of a segment that has been modified since the last time the segment was transferred to the target database. In this case, the method transfers the modified segment along with metadata indicating which segment it is replacing) and stores the new digital signature. In this way, the digital signatures stored at the source are indicative of the current data stored in the target database (assuming the segments have all been transferred).

In some embodiments, each database segment is one or more rows of a table in the database. Some embodiments impose certain restrictions—for example, that the segments are non-overlapping and that each segment includes rows from only one table. That is, in such embodiments, each table of the database is divided into one or more segments, with each of those segments including one or more rows and each row only belonging to a single segment. These segments are not always the same size (even within a table), as will be described further below. For example, within a single table, a first segment might include hundreds of rows while a second segment includes only a single row. In certain cases, all of the segments are a single row (i.e., each row is a separate segment). In some embodiments, the digital signature for segments divided in this manner is generated by hashing each row of the segment and then performing an operation on the hashes (e.g., another hash, an xor operation). In some embodiments, the operation performed on the row hashes is order invariant (i.e., the order of the rows does not affect the output of the operation).

Different embodiments divide the data in the source database into segments using different segmentation processes. Some embodiments divide each table in the database separately, by using a data segmentation process to dynamically determine a set of segmentation criteria for the table. That is, some embodiments analyze each table (or statistics/metadata kept for the table) to identify segmentation criteria for the table, then use the identified segmentation criteria to divide the table into segments. In performing the analysis of a table, the data segmentation process of some embodiments attempts to find segmentation criteria that result in optimal data segment sizes. In general, larger data segments (and therefore fewer segments in a table) provide the advantage of having fewer digital signature computations and stored digital signatures, but require larger data transfers for a single modification to the source database. Correspondingly, smaller data segments make it easier to transfer a given segment, but require more digital signature computation/storage.

Some embodiments use a set of one or more columns of a database table as the segmentation criteria for the table (referred to herein as segmentation columns). Specifically, in some embodiments, the values stored in the segmentation columns for a given row are used to identify the data segment to which that row belongs. In some embodiments, all rows with the same (or similar in a specific way) values in the segmentation columns are grouped into the same data segment. Different embodiments may require the segmentation column values for rows within the same data segment to be exactly equal, within a particular range (e.g., for numbers), have a same text string to start the value, etc., so long as a simple query identifies the rows belonging to a segment.

The data segmentation process of some embodiments analyzes the columns of a table (and, in some cases, generates an additional column or columns for the table) to identify a set of optimal segmentation columns. In some embodiments, databases include metadata and/or statistics for each table that includes histograms of the values in each column of the table. These histograms indicate the frequency with which each value appears in a column and/or the statistical distribution of the values within the column. The data segmentation process of some embodiments, for a given table, analyzes the histograms for the columns of the table to identify the expected number of data segments and data segment size for different possible segmentation columns and/or column groups, and selects the set of segmentation columns with the optimal expected number of segments and segment size.

In some embodiments, when none of the possible sets of segmentation columns is expected to produce optimal segmentation, some embodiments use one or more additional data segmentation process. Some embodiments apply a bucketing function to columns with highly unique values (e.g., a user_id column). For instance, for a column that has unique integer values, some embodiments compute the data value modulo a desired number of data segments (which may be based on the table size) to generate a value used for data segmentation. This value can be stored in a newly-generated column or computed on the fly in different embodiments. Another data segmentation technique used by some embodiments is to generate a completely new column for the table that is not based on an existing column. This column can be assigned a random value (e.g., a random integer) within a range, and the new column then used for segmentation. Some embodiments will use one of the data segmentation processes (e.g., based on histogram analysis) for segmentation of a first table and a different data segmentation process (e.g., by applying a bucketing function to a column or generating a new column) for segmentation of a second table.

In addition, an administrator (e.g., that is managing the data migration process) can also modify the segmentation configuration after the data segmentation process has run. In some embodiments, a segmentation configuration file (e.g., a configuration table) is generated that specifies, for each table, the set of segmentation columns as well as the average (e.g., mean and/or median) block size. The administrator, in some embodiments, is able to modify the set of segmentation columns via this configuration table. For instance, if the set of segmentation columns chosen dynamically has values that often change, this may not be desired and so the administrator may select a new set of segmentation columns with more static values.

As described above, once the segmentation criteria are chosen, the source database is divided into the data segments using these criteria, the data is transferred to the destination database in blocks, and the digital signature data is stored at the source side. Some embodiments store a table indicating the segmentation criteria for each segment (e.g., the values in the segmentation columns) as well as the digital signature of the segment transferred to the destination database. For the iterative checks, the digital signatures for each segment are compared to the corresponding value in this digital signature table. The table also indicates whether any new segments have been added (i.e., if a new value appears in one of the segmentation columns) or removed (i.e., if there are no longer any rows having a particular set of values in the segmentation columns). Some embodiments transfer each change to the destination as (i) metadata indicating the change and (ii) the data segment. For additions and modifications, the updated data segment is included. For removal of a segment, only metadata is sent to indicate to the destination to remove that segment from the target database.

This iterative process can be performed until the target database is ready to become active (i.e., is available to be accessed). At this point, a period of downtime is allowed so that the source database will no longer have any new modifications, and the most recent modifications (since the last iteration of the incremental transfer) can be identified and transferred to the target database, at which point the operation is complete.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 7 illustrates additional modifications to a source database table that result in modification to an existing data segment.

FIG. 9 illustrates an example of a segmentation configuration table.

FIG. 10 illustrates an example of a database table segmented based on two columns A and B.

DETAILED DESCRIPTION

Some embodiments of the invention provide a novel method for migrating data from a first source database (or other formatted data storage) to a second target database (or other similarly formatted data storage), where the data is susceptible to change at the source database before all of the data is transferred to the target database and the target database is fully accessible (thereby replacing the source database for active use). Specifically, some embodiments divide the source database into segments and transfer these segments incrementally, then iteratively check the source database to determine whether any segments have been modified and transfer these modified segments to the target database to replace the corresponding segments previously transferred to the target database.

Figure 1:
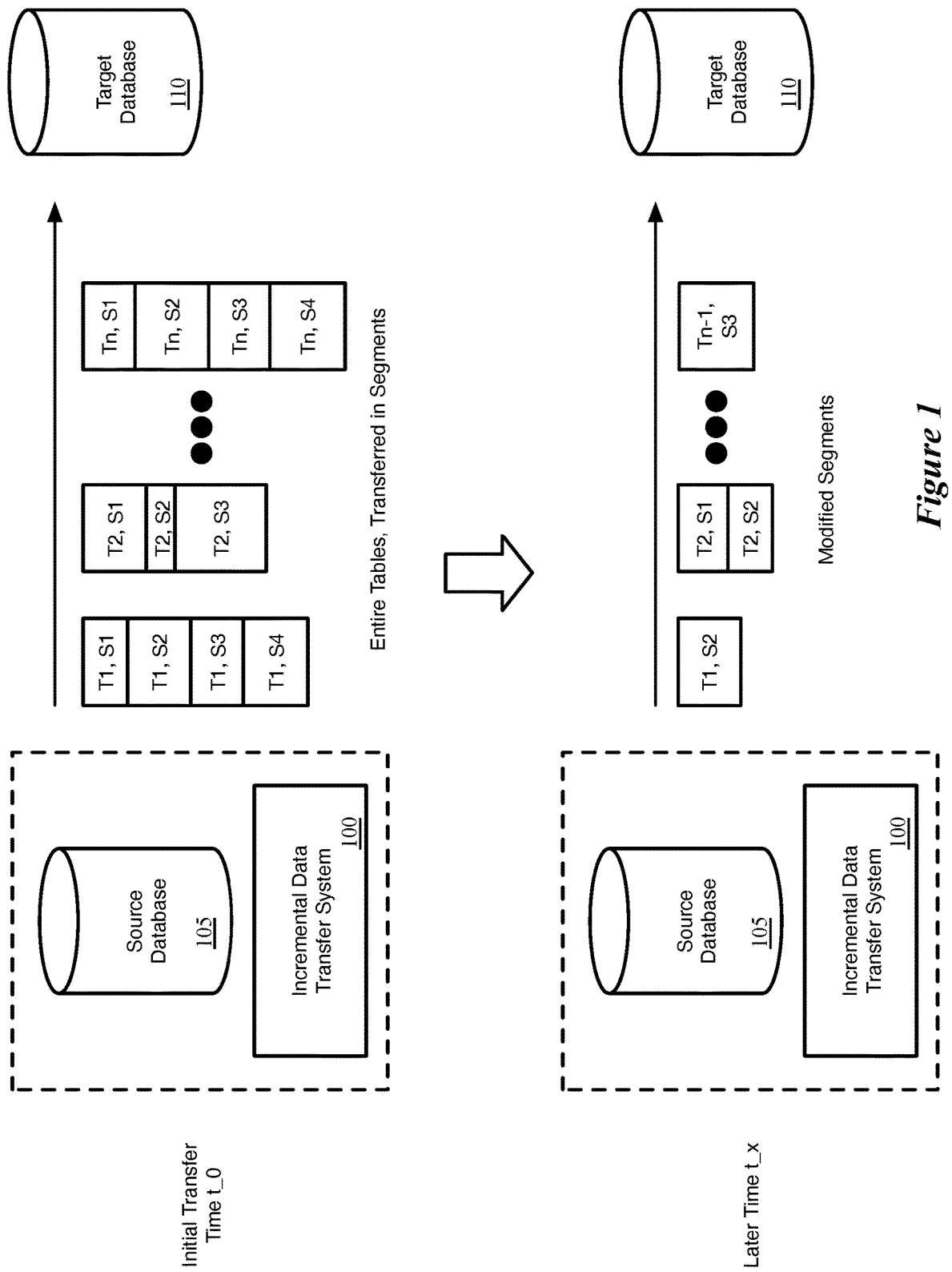
FIG. 1 conceptually illustrates an example of data transfer using an incremental data transfer system of some embodiments.

FIG. 1 conceptually illustrates an example of such data transfer using an incremental data transfer system 100 of some embodiments. Details of the incremental data transfer system of some embodiments are described in greater detail below by reference to FIG. 2. As shown here in FIG. 1, at an initial time t_0 (which may encompass an extended time period), the contents of a source database 105 are transferred to a target database 110. In many cases, the source database 105 is an on-premises database (e.g., such as that commonly provided by Teradata or Oracle), while the target database 110 is a cloud data warehouse (CDW) database. While shown as databases, it should be understood that the invention as described herein can apply to any sort of formatted data that needs to be transferred from one data storage to another.

In some embodiments, this process requires making a copy of the database to a local file system via a local connection at the source, transferring the contents over a remote connection to a destination file system, and then writing the database contents to the new database (via a connection local to the target system). In typical cases, the transfer over the remote connection from the source database 105 or local file system to the destination file system takes the longest amount of time due to a slower connection. For instance, enterprise databases may store multiple terabytes of data, and thus the transfer time could be several months (e.g., transferring 50 TB of data requires nearly 51 days at a transfer speed of 100 Mbps, assuming full capacity at all times). Due to enterprise requirements, the source database 105 cannot be inactive for this entire transfer period, and the target database 110 will typically require various tests to ensure data integrity and accurate database structure before becoming active. As such, during this time period, the source database 105 will typically be modified, such that the data that is copied to the target database 110 at the end of time period t_0 does not accurately reflect the most updated version of the source database 105.

Rather than simply copying all of the database tables of the source database 105 over to the target database 110 wholesale, the incremental data transfer system of some embodiments divides the data into segments and transfers the data in segments. In some embodiments, each of the tables is divided separately into its own set of segments. As shown for the initial transfer in FIG. 1, some embodiments initially transfer the entire database, but with each table divided into segments. In this example, table T1 is divided into four segments, table T2 is divided into three segments, and the last table Tn is divided into four segments.

In some embodiments, each segment is one or more rows of the table. Some embodiments impose certain restrictions—for example, that the segments are non-overlapping and that each segment includes rows from only one table. These segments are not always the same size (even within a table), as will be described further below. For example, in the case of table T2, segment S3 is much larger than segment S2 and somewhat larger than segment S1. Similarly, different tables may have different numbers of segments. In certain cases, all of the segments are a single row (i.e., each row is a separate segment). The segmentation of each table, in some embodiments, is based on segmentation criteria dynamically determined by the incremental data transfer system 100. As described in greater detail below, some embodiments divide each table in the database separately, by using a data segmentation process to dynamically determine a set of segmentation criteria for the table. That is, some embodiments analyze each table (or statistics/metadata kept for the table) to identify segmentation criteria for the table, then use the identified segmentation criteria to divide the table into segments.

At a later time (t_x in the example of FIG. 1), the incremental data transfer system 100 identifies segments that have been modified within the source database 105 since the segment was last transferred to the target database 110. The incremental data transfer system 100 then only transfers these modified segments for the current iteration, thereby avoiding the need to transfer the entire database again. As shown in the example, the transfer at time t_x only transfers one of the segments of table T1, two of the segments of table T2, and none of the segments of table Tn (though a segment of table Tn−1 is shown as being transferred).

To determine whether segments have been changed, the incremental data transfer system 100 of some embodiments generates a digital signature (fingerprint) for each segment of the source database 105 at the time t_0 of the initial transfer and stores this information in a separate table along with indicators for each of the segments. The signatures are generated in such a way that any change in the digital signature for a segment is indicative of a change in the segment, and any change in the segment will cause a change in the digital signature. For instance, some embodiments generate a hash value of the segment or use a similarly deterministic algorithm based on the data in the segment.

At each iteration (e.g., at time t_x), the incremental data transfer system 100 of some embodiments generates new digital signatures for each of the segments (or at least a subset of the segments being checked at the specific iteration) and compares these new digital signatures to the stored signatures. Each digital signature that is different from the corresponding stored signature is indicative of a segment that has been modified since the last time the segment was transferred to the target database. In this case, the method transfers the modified segment and stores the new digital signature. In this way, the digital signatures stored at the source are indicative of the current data stored in the target database (assuming the segments have all been transferred).

This iterative process can be performed until the target database 110 is ready to become active (i.e., is available to be accessed) and the time to transfer all of the modifications has been reduced (as the amount of data to transfer grows smaller at subsequent iterations, at least initially, fewer modifications will occur during the transfer, and thus the next iteration should have even fewer modifications). At this point, a period of downtime is allowed so that the source database 105 will no longer have any new modifications, and the most recent modifications (since the last iteration of the incremental transfer) can be identified and transferred to the target database, at which point the operation is complete.

Figure 2:
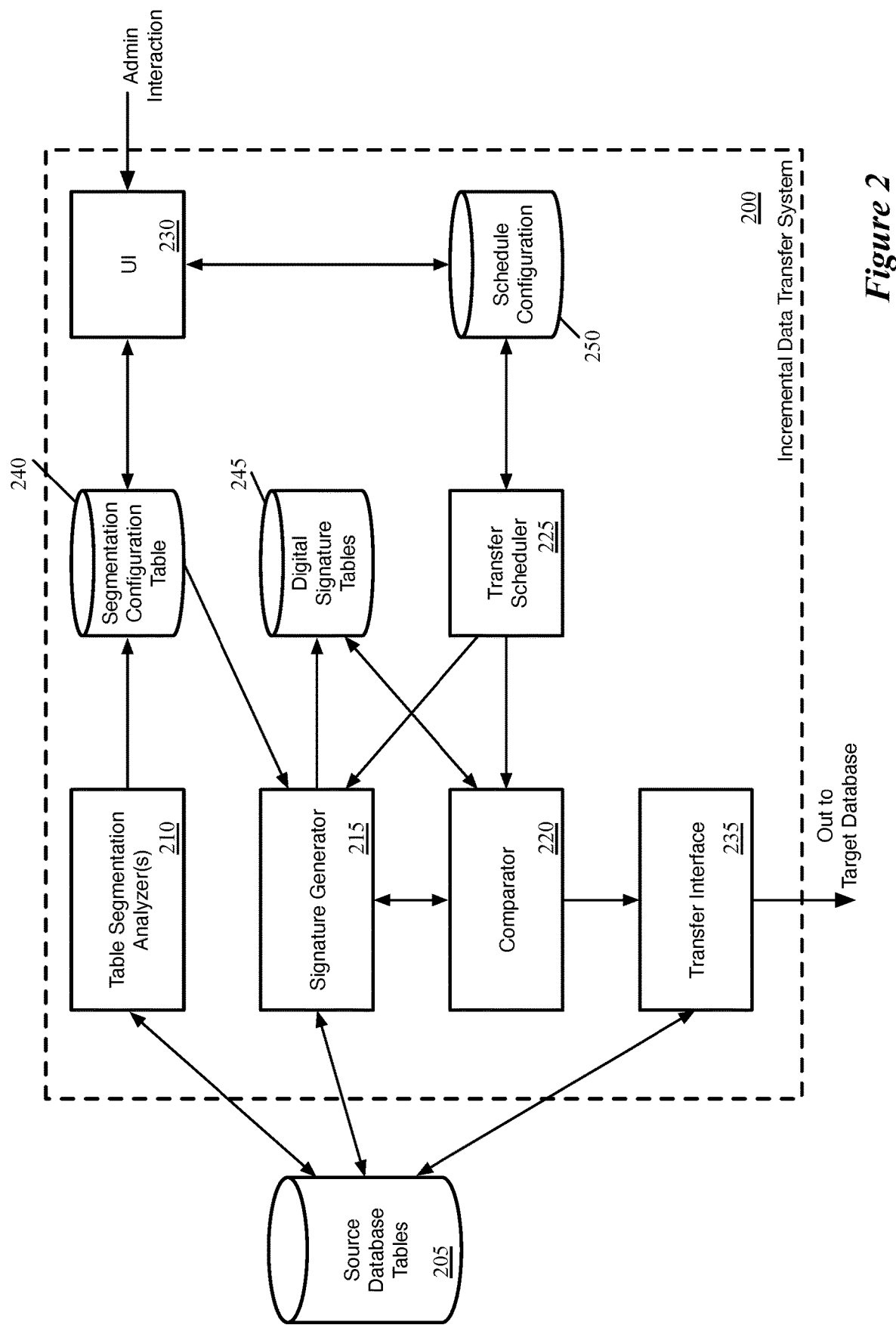
FIG. 2 conceptually illustrates the architecture of an incremental data transfer system of some embodiments.

As mentioned, FIG. 2 conceptually illustrates the architecture of an incremental data transfer system 200 of some embodiments in greater detail. This incremental data transfer system 200 executes local to the source database. For instance, in many cases the source database is an on-premises enterprise database, while the target database is a cloud data warehouse database. In this case, the incremental data transfer system 200 executes at the on-premises datacenter to segment the source database and transfer these data segments to the cloud data warehouse. As shown in the figure, the incremental data transfer system 200 interacts with the source database tables 205. These database tables 205, in different embodiments, may be the tables as stored in the source database or a copy of the database (e.g., to a file system local to the source datacenter).

The incremental data transfer system 200 of some embodiments includes a table segmentation analyzer 210, a signature generator 215, a comparator 220, a transfer scheduler 225, a user interface 230, and a transfer interface 235.

In addition, the incremental data transfer system 200 stores a segmentation configuration table 240, digital signature tables 245, and a schedule configuration 250. These additional stored data 240-250 will be described in detail in the context of the operation of the incremental data transfer system 200.

The table segmentation analyzer 210 implements one or more data segmentation processes to determine the segmentation criteria for dividing the source database tables 205 into segments. The segmentation of each table, in some embodiments, is based on segmentation criteria dynamically determined by the table segmentation analyzer 210. Some embodiments divide each table in the database separately, by using a data segmentation process to dynamically determine a set of segmentation criteria for the table. That is, the table segmentation analyzer 210 of some embodiments analyzes each table (or statistics/metadata/heuristics kept for the table) to identify segmentation criteria for the table, then uses the identified segmentation criteria to divide the table into segments.

In performing the analysis of a table, the table segmentation analyzer 210 of some embodiments attempts to find segmentation criteria that result in optimal data segment sizes. In general, having larger data segments (which means fewer segments in a table) provides the advantage of having fewer digital signature computations and stored digital signatures, but requires larger data transfers for a single modification to the source database 205. Correspondingly, smaller data segments make it easier to transfer a given segment, but require more digital signature computation/storage (i.e., in the digital signature tables 245).

The table segmentation analyzer 210 of some embodiments analyzes the columns of a table (and, in some cases, generates an additional column or columns for the table) to identify a set of optimal segmentation columns. In some embodiments, databases include metadata and/or statistics for each table that includes histograms of the values in each column of the table. These histograms indicate the frequency with which each value appears in a column and/or the statistical distribution of the values within the column. The table segmentation analyzer 210 of some embodiments analyzes the histograms for the columns of a given table to identify the expected number of data segments and data segment size for different possible segmentation columns and/or column groups, and selects the set of segmentation columns with the optimal expected number of segments and segment size. These optimal results may be administrator-determined or automatically-generated based on various factors (e.g., overall database size, transfer bandwidth restrictions, etc.).

In some embodiments, when none of the possible sets of segmentation columns is expected to produce optimal segmentation based on the column histogram analysis performed by the table segmentation analyzer 210, the table segmentation analyzer 210 uses one or more additional data segmentation process. For instance, the table segmentation analyzer 210 may identify a column with unique values that can be bucketed (e.g., a column storing unique values for which a modulo function can be used to bucket the values), and then use the bucketed values as the segmentation column for the table. If no such column exists for a table, the table segmentation analyzer 210 generates a new column and assigns each row a random value within a range in some embodiments, and then uses this new column as the segmentation column for the table. The data segmentation processes performed by the table segmentation analyzer 210 are described in greater detail below by reference to FIGS. 8-11.

The table segmentation analyzer 210 generates and stores a segmentation configuration table 240 that defines the segmentation criteria for each of the source database tables 205. For example, in some embodiments, the configuration table 240 includes a row for each of the source database tables 205, specifying (i) an indicator for the table (such as the table name), the segmentation criteria for the table (e.g., the set of segmentation columns), and the average (e.g., mean and/or median) segment size that results from this set of segmentation criteria.

In some embodiments, an administrator (e.g., that is managing the data migration process) can modify the segmentation criteria stored in the segmentation configuration table 240 through the UI 230 after the table segmentation analyzer 210 has generated the initial segmentation criteria for the source database tables 205. For instance, if the set of segmentation columns chosen dynamically by the table segmentation analyzer 210 has values that often change, this may not be desired and so the administrator may select a new set of segmentation columns with more static values. In some embodiments, the UI 230 allows the administrator to view the configuration table (e.g., as a spreadsheet, a text document, a database table, etc.) and provide edits to at least the segmentation criteria column for one or more tables.

Once the segmentation configuration is generated by the table segmentation analyzer 210, the signature generator 215 of some embodiments generates digital signatures for each of the data segments. As indicated, the segmentation configuration table 240 indicates the segmentation criteria for each table, which the signature generator 215 uses to generate the digital signatures. The signature generator 215 stores the digital signatures for the segments of each table in the digital signature tables 245. Some embodiments store a separate digital signature table 245 corresponding to each of the source database tables 205. In some embodiments, the digital signature table 245 for a particular source database table 205 includes a row for each segment, with each row indicating (i) the value(s) stored in the segmentation columns that define the segment and (ii) the digital signature generated for the segment. These digital signatures are used at subsequent iterations to determine whether segments of the source database tables 205 have been modified.

The signature generator 215 generates the digital signatures in such a way that any change in the digital signature is indicative of a change in the segment, and any change in the segment will cause a change in the digital signature (barring highly-unlikely hash collisions). For instance, some embodiments generate a hash value of the segment or use a similarly deterministic algorithm based on the data in the segment. Specifically, for a data segment defined by a particular set of values in the segmentation columns, some embodiments generate a hash of each row that has that particular set of values in the segmentation columns, then perform an additional operation on these resultant hashes (e.g., another hash of the hashes, an xor operation on each bit of the resultant hashes, etc.). In some embodiments, this latter operation is order-invariant such that the order of the row hashes does not matter.

The transfer interface 235 handles the transfer of the data segments to the target database in some embodiments. For the initial transfer of the entire database, the transfer interface sends each data segment along with metadata identifying the data segment to the target database (e.g., by extracting the rows belonging to the segment from the source database tables 205). The metadata, in some embodiments, includes a table identifier and a segment identifier for each data segment. This metadata allows a system at the target database to (i) correctly reconstruct the tables and (ii) correctly replace modified segments at later iterations of the incremental transfer (by matching the segment identifiers). It should be noted that, in some embodiments, the initial transfer of the source database tables is performed via a physical transfer (e.g., by loading the source database tables onto a physical file system device (or multiple devices) and physically shipping this device(s) to the destination. This shortens the time for the initial transfer of the entire database, and subsequent transfers via the connection between the source and the target allows for the transfer of modified database segments.

At subsequent times, the incremental data transfer system 200 identifies modified data segments (as well as new data segments and data segments that have been removed from the source database tables 205) and transfers these modified data segments to the target database. In some embodiments, the iterations of this incremental transfer are performed according to a schedule configuration 250 that is defined either automatically or by the administrator managing the transfer process. For instance, the administrator may define the schedule configuration 250 through the user interface 230.

The schedule configuration, in some embodiments, specifies a schedule for checking the various tables of the source database 205 for modifications. For larger databases, some embodiments do not check every table at each iteration, but instead cycle through groups of tables. For instance, a schedule might specify that over the course of ten nights, the entire database 205 will be checked for modifications, with a different tenth of the tables being checked each night. Some embodiments define a schedule 250 that starts with smaller portions of the database at each iteration and grows the size of each portion for later iterations as the expected number of modifications is expected to slow down. In addition, the schedule can impose certain restrictions on a particular iteration (e.g., putting a cap on the amount of data that can be transferred in a run) or on the process generally (e.g., excluding certain tables from the process that do not need to be transferred to the target database).

The transfer scheduler 225 is responsible for coordinating the signature generator 215 and comparator 220 to identify modified segments in the source database tables 205 according to the schedule configuration. For a given iteration, the transfer scheduler 225 specifies to the signature generator 215 which source database tables 205 need to be checked. The signature generator 215 generates new digital signatures for each of the data segments in these tables (again, according to the data in the segmentation configuration table 240) and provides the new digital signatures to the comparator 220.

The comparator 220 reads the currently stored digital signatures for these segments from the appropriate digital signature table 245, and compares the new digital signatures to the stored signatures. Each digital signature that is different from the corresponding stored signature is indicative of a data segment that has been modified since the last time the data segment was transferred to the target database. In this case, the comparator 220 specifies for the transfer interface 235 to transfer the modified segment along with the metadata indicating which segment it is replacing to the target database. In addition, the comparator 220 (or the signature generator 215) replaces the old digital signature for the modified segment with the newly computed signature in the digital signature table 245. Some embodiments only store the most current digital signature tables, while other embodiments store a history of the digital signature tables that can be analyzed to determine which segments have been modified during the course of the iterative data transfer.

Figure 3:
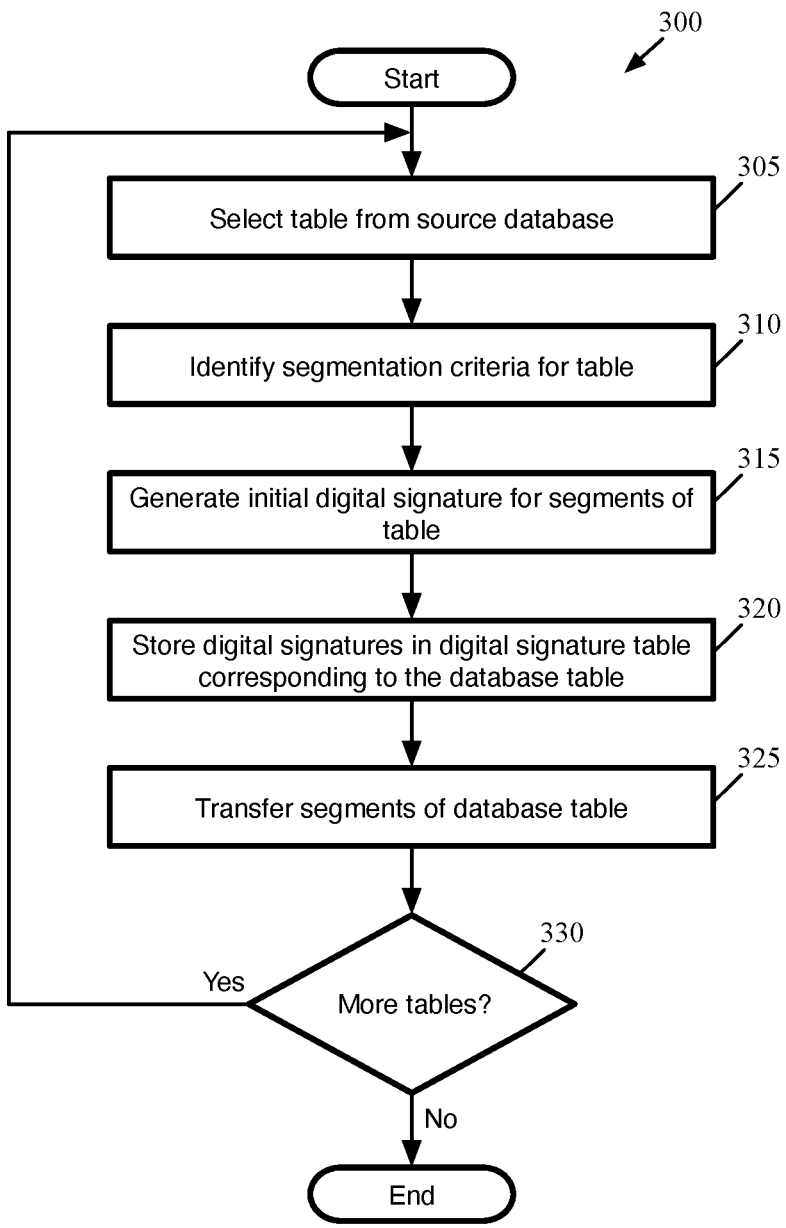
FIG. 3 conceptually illustrates a process of some embodiments to generate initial digital signatures for the data segments of a database and transfer the database tables incrementally.

FIG. 3 conceptually illustrates a process 300 of some embodiments to generate the initial digital signatures for the data segments of a database and transfer the database tables incrementally. In some embodiments, the process 300 is performed by the incremental data transfer system (e.g., by the digital signature generator and/or other modules of the system 200). The process 300 will be described in part by reference to FIG. 4, which illustrates an example of a digital signature table 400 generated for a database table 405 of a source database 410. The database table 405 includes three columns (A, B, and C) and nine rows, from which the digital signature table 400 is generated. In addition, as shown in this figure, digital signature tables 415-420 are also generated for each of the other database tables 425-430 in the source database 410.

As shown in FIG. 3, the process 300 begins by selecting (at 305) a table from the source database. In some embodiments, the order in which the process selects the tables is scheduled (e.g., by an administrator), while in other embodiments the order is random or determined automatically based on the database structure.

Next, the process 300 identifies (at 310) segmentation criteria for the table. In some embodiments, this segmentation criteria is stored in a segmentation configuration table after having previously been generated by data segmentation process (described in greater detail below). The segmentation criteria, in some embodiments, specify which columns of the database table are used to divide the table into segments. In the example shown in FIG. 4, column A of the database table 405 is the segmentation column—in this case, all of the rows have values of either 1, 2, or 3 for this column while the other columns have unique values that are not shared between any of the rows.

Using the segmentation criteria, the process 300 generates (at 315) the initial digital signatures for the segments of the table. It should be noted that the segmentation criteria stored in the segmentation configuration table of some embodiments does not identify the different values of the segmentation columns. In some embodiments, the digital signature generator uses a query to generate the digital signatures. For instance, some embodiments use a query that specifies to use the signature generation function (e.g., hash of all rows in a segment and then a group hash or other operation applied to those resultant hashes) for the particular table (using its table identifier) grouped by the segmentation columns (e.g., using the GROUP BY construct in SQL which partitions the data in a table into disjoint groups). Such a query will identify each group (using the values in the segmentation columns from the segmentation configuration table) and compute the digital signatures for each column.

Figure 4:
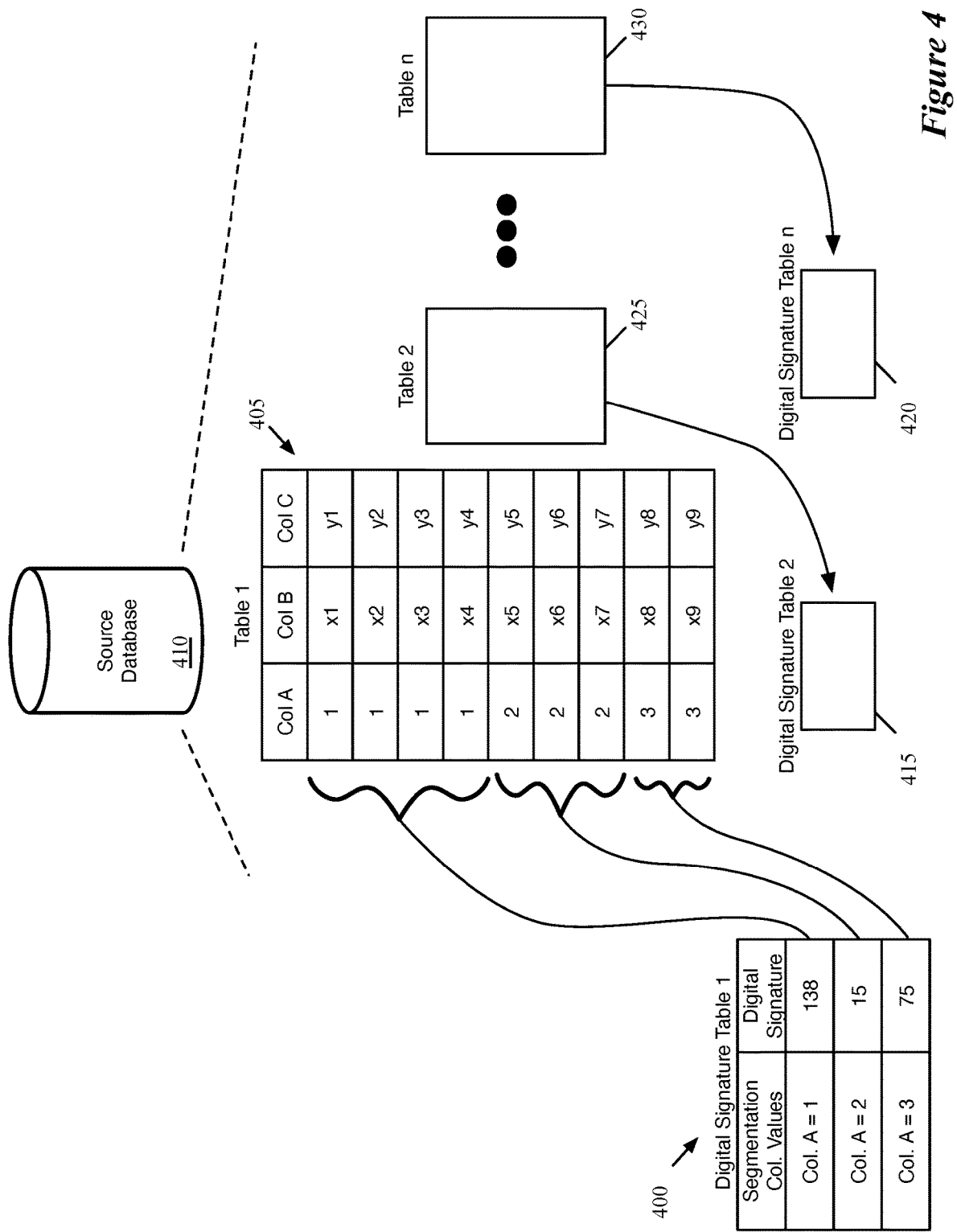
FIG. 4 illustrates an example of a digital signature table.

The process 300 the stores (at 320) the digital signatures in the digital signature table corresponding to the currently selected database table. As mentioned, some embodiments store a separate digital signature table for each database table, as shown in FIG. 4. The digital signature table includes one row for each segment of the database table (as determined based on the values in the segmentation columns for the database table), with columns for (i) the segmentation column values that define each segment and (ii) the digital signature for the segment.

In FIG. 4, the database table 405 has three segments defined by the values in column A. The first segment (for col. A=1) includes four rows, the second segment (for col. A=2) includes three rows, and the third segment (for col. A=3) includes two rows. For the first segment, the digital signature generator of some embodiments computes a hash of each of the first four rows in the table, then performs another operation on these resultant hash values to arrive at the value 138. This digital signature (138) is stored in the digital signature table 400. Similarly, the signature generator computes the digital signatures for the other two segments and stores these values (15 and 75 respectively) in the digital signature table 400. The same process is performed for each of the other database tables 425-430, with the digital signatures stored in the corresponding digital signature tables 415-420. These additional tables 425-430 will not necessarily have the same number of data segments (or the same average segment size) as the first table 405. It should also be noted that while the example database table 405 has nine rows, data segmentation would generally not be necessary if all of the tables were this small. A typical table in a database for which the incremental transfer process is useful may have thousands or even millions of rows, such that segmenting the table into dozens or hundreds of rows provides an advantage for the subsequent data transfers.

Returning to FIG. 3, the process 300 transfers (at 325) the segments of the database table to the target database. As mentioned, in some embodiments, these segments are transferred over a connection between the source system (e.g., an on-premises datacenter) and the destination system (e.g., a cloud data warehouse). In some embodiments, each of the data segments is transferred along with metadata indicating the data segment (e.g., with a segment identifier based on the segmentation column values that define the segment). The metadata is used by the target system to determine which stored segment to replace when modifications are sent later in the iterative transfer process.

Finally, the process 300 determines (at 330) whether more source database tables remain to be transferred. When additional tables remain, the process returns to 305 to select the next table from the source database. Once all of the tables have been transferred (i.e., sent to the target database, the process ends. It should be noted that the process 300 is a conceptual process, and some embodiments may vary in the actual operation. For example, some embodiments generate and store all of the digital signatures in a relatively short period of time, but transfer the data segments more slowly due to data transfer rate limitations.

As noted above, as the owner of the database being transferred will not want to have their database inaccessible for an extended period of time, the source database will generally be modified during the course of the initial data transfer (as well as while tests are performed on the target database to verify that the target database is ready to become active). The incremental data transfer system of some embodiments thus iteratively reviews the source data to determine which data segments are modified and transfers these modified segments to the target database to replace the now-outdated segments at the target database. At each iteration, the method of some embodiments generates new digital signatures for each of the segments (or at least a subset of the segments being checked at the specific iteration) and compares these new digital signatures to the stored signatures. Each digital signature that is different from the corresponding stored signature is indicative of a segment that has been modified since the last time the segment was transferred to the target database. In this case, the method transfers the modified segment along with metadata indicating which segment it is replacing and stores the new digital signature.

Figure 5:
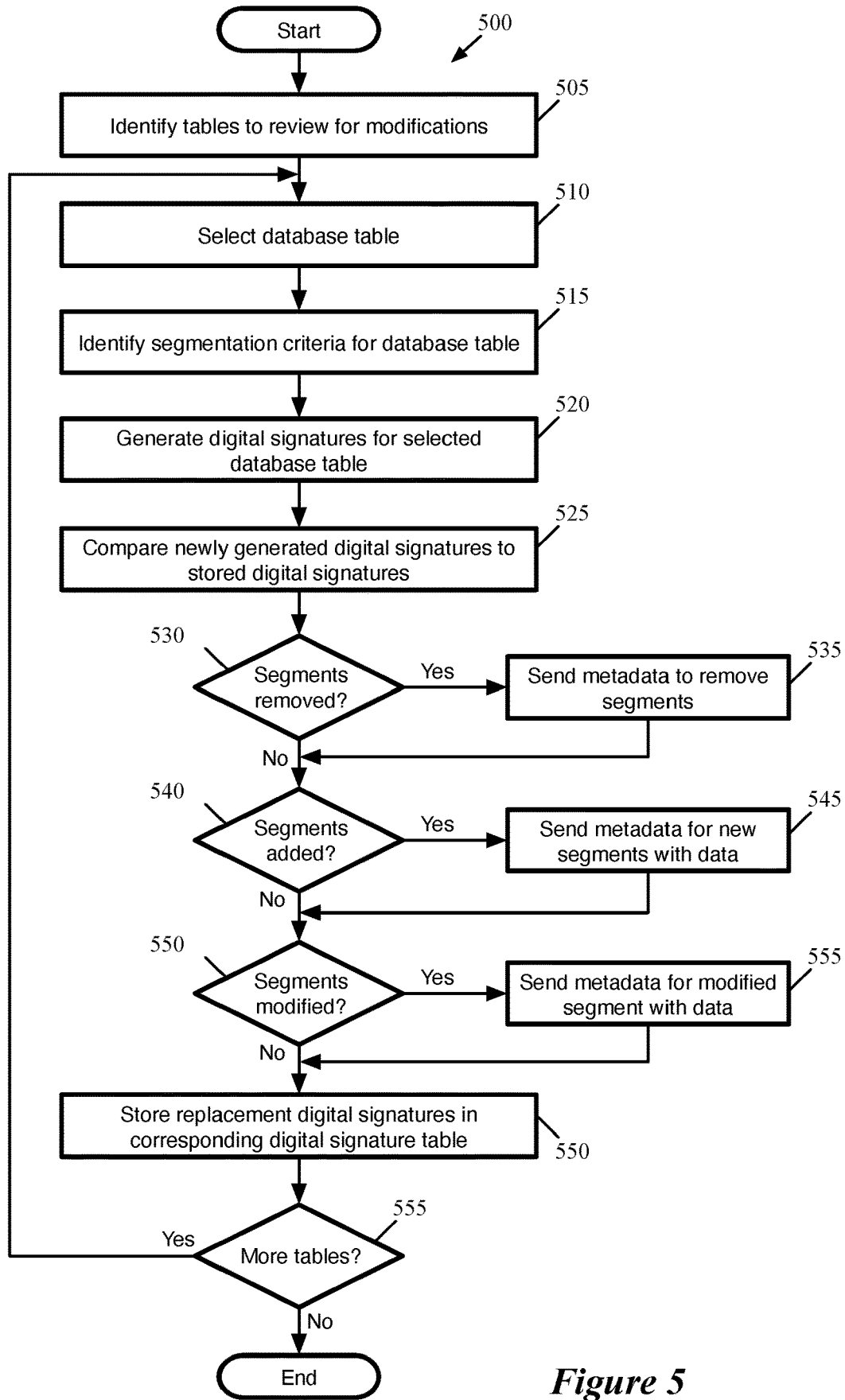
FIG. 5 conceptually illustrates a process of some embodiments for reviewing a set of source database tables to identify modifications and transfer the modified segments to the target database.

FIG. 5 conceptually illustrates a process 500 of some embodiments for reviewing a set of the source database tables to identify modifications and transfer the modified segments to the target database. In some embodiments, the process 500 is performed by the incremental data transfer system (e.g., by the digital signature generator 215 and comparator 220) according to a schedule (e.g., defined either by an administrator or by an automatic scheduling process). The process 500 will be described by reference to FIGS. 6 and 7, which illustrate different modifications to the database table 405 of FIG. 4.

As shown, the process 500 begins by identifying (at 505) tables to review for modifications. For smaller databases, some embodiments review all of the tables each iteration of the process 500 (or a similar process). On the other hand, for larger databases, some embodiments do not review every table at each iteration, but instead cycle through groups of tables according to a predefined schedule (e.g., defined by an administrator). For instance, a schedule might specify that over the course of five nights, the entire database will be reviewed for modifications, with a different fifth of the tables being checked each night.

Next, the process 500 selects (at 510) one of the identified tables. As in the process 300, in some embodiments the tables may be selected in a particular order that is scheduled by an administrator, while in other embodiments the order is random or determined automatically based on the database structure.

The process 500 then identifies (at 515) segmentation criteria for the table. In some embodiments, this segmentation criteria is stored in a segmentation configuration table after having previously been generated by data segmentation process (described in greater detail below). The segmentation criteria, in some embodiments, specify which columns of the database table are used to divide the table into segments.

Using this segmentation criteria, the process 500 generates (at 520) digital signatures for the selected table. As described above, the digital signature generator of some embodiments uses a query to generate the digital signatures. For instance, some embodiments use a query that specifies to use the signature generation function (e.g., hash of all rows in a segment and then a group hash or other operation applied to those resultant hashes) for the particular table (using its table identifier) grouped by the segmentation columns. Such a query will identify each group (using the values in the segmentation columns from the segmentation configuration table) and compute the digital signatures for each column.

The process 500 then compares (at 525) the newly generated digital signatures to the stored digital signatures in order to identify any modifications to the currently selected table. To perform this comparison, some embodiments determine whether each newly computed digital signature for a particular data segment (defined by a set of segmentation column values) (i) has a corresponding row in the digital signature table and (ii) exactly matches the digital signature stored in that row of the digital signature table. If new values have appeared in the segmentation columns (or, for a database table with multiple segmentation columns, a new combination of values), then there will not be a corresponding row in the digital signature table (as this will represent a new segment). In addition, if no digital signature is generated for an existing row in the digital signature table, then that indicates that the data segment with the column segmentation values specified in the existing row of the digital signature table no longer exists.

The process 500 determines (at 530) whether modifications to the database table have resulted in any segments of the table having been removed. These removals occur, as noted, when the segmentation column values of all of the rows in a previously-existing data segment are changed such that the database table no longer has any rows with the corresponding set of segmentation column values. In this case, the process 500 sends (at 535) metadata to the target system to remove this segment from the target database. Because there is no data (i.e., database table rows) for this segment in the modified source database, the metadata is sent to the target system without any data.

The process 500 also determines (at 540) whether modifications to the database table have resulted in any new segments having been added to the table. These additions could occur as a result of (i) segmentation column values of existing rows being changed to a new value or set of values that did not previously exist in the table or (ii) new rows being added to the database table with segmentation column values that did not previously exist in the table. In this case, the process 500 sends (at 545) metadata for the new segment along with the data (i.e., the rows of the database table that make up the new segment) to the target system. Based on this metadata (which can either explicitly indicate that the segment is new or use a segment identifier that does not correspond to any of the existing segments in the target database), the target system will add the new rows to the target database.

Figure 6:
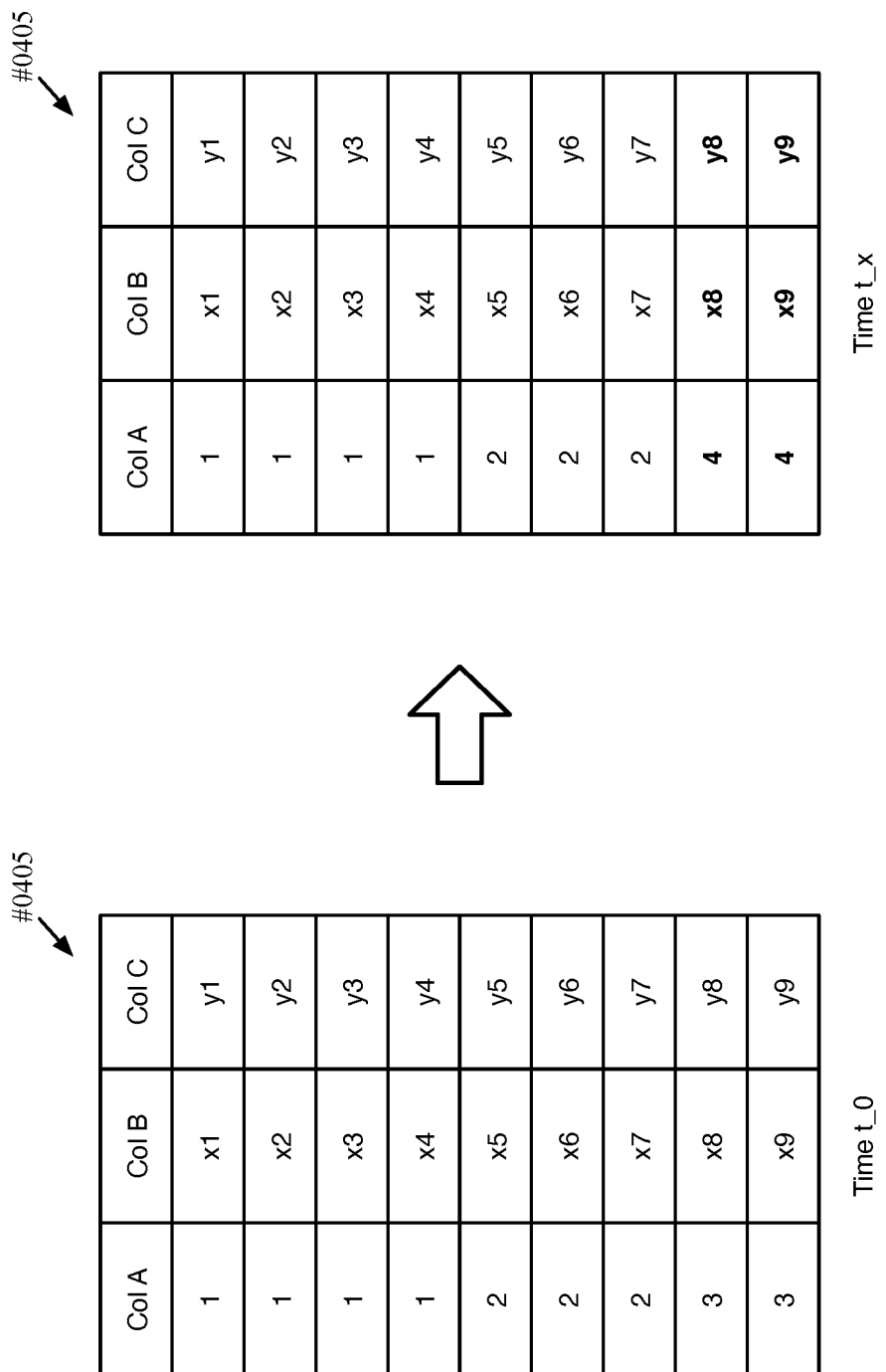
FIG. 6 illustrates modifications to a source database table that result in removal of a data segment and addition of a new data segment.

FIG. 6 illustrates modifications to the source database table 405 from the example shown in FIG. 4 that result in removal of a data segment and addition of a new data segment. At time t_0, the database table 405 includes three data segments, as described above. However, at later time t_x, the data segment of rows with the value 3 in the segmentation column A no longer exists, as these values have been changed to the value 4 (the affected rows are shown in bold text). As a result, the incremental data transfer system would identify the removal of the existing segment (with col. A=3) and the addition of a new segment (with col. A=4), and transfer the data and metadata to the target system accordingly.

In addition, the process 500 determines (at 550) whether modifications to the database table have resulted in any existing segments being modified. These modifications could occur due to the modification of a value in a non-segmentation column (which results in a modification to the data segment that includes the row with that value) or the modification of a segmentation column value such that a row moves from one previously-existing data segment to another (which results in a modification to both the data segment to which the row previously belonged and the data segment to which the row now belongs). If the segmentation columns are chosen such that their values change less frequently than those in the other columns of the table, then modified data segments should be more common than removed data segments or added data segments. For any modified segments, the process 500 sends (at 555) metadata for the modified segment along with the data (i.e., the rows of the database table that make up the modified segment) to the target system. Based on this metadata (which includes a segment identifier that corresponds to the previously-transferred data segment), the target system will remove the previously-transferred data segment and replace it with the new data segment.

FIG. 7 illustrates additional modifications to the source database table 405 that result in modification to an existing data segment. In this case, the database table 405 was initially transferred at time t_0, and then at t_x a new data segment (based on col. A=4) was transferred in addition to the previously-existing segment being removed (as described by reference to FIG. 6). Here, at time ty, the database table 405 is evaluated again and a different digital signature is calculated for the existing data segment based on col. A=2, due to one of the non-segmentation column values being modified (y5 has been changed to y10). Because this results in a different hash value for this row, the overall digital signature is modified as well, causing the incremental data transfer system to determine that the data segment has been modified. As such, the transfer system transmits metadata indicating the data segment to replace as well as all three rows of this data segment to the target system.

Returning to FIG. 5, the process 500 stores (at 560) the replacement digital signatures in the digital signature table corresponding to the currently selected database table. Some embodiments store each iteration of the digital signature table so as to be able to analyze the history of the corresponding database table modifications over the course of the entire transfer process, while other embodiments store only the most up-to-date digital signature table. In the former case, an entire new digital signature table is stored based on the digital signatures computed during this current iteration of the table analysis (due to the minimal size of the digital signature tables, storing numerous copies is generally not a problem). In the latter case, some embodiments delete the old table and store a brand new table, or make modifications to the existing table (i.e., replace digital signature values, remove or add rows as needed).

The process 500 then determines (at 565) whether additional tables remain to be reviewed during the current iteration of the incremental data transfer process. As noted above, some embodiments only review a subset of the tables at each iteration, as determined by a predefined schedule. If additional tables remain for the current iteration, the process returns to 510 to select another database table for review. Once all of the tables identified for the current iteration have been reviewed and the modifications transferred (or at least flagged for transfer, as the actual transfer could take longer due to connection speed limitations), the process ends.

This iterative process (i.e., process 500 or a similar process) can be performed repeatedly until the target database is ready to become active (i.e., is available to be accessed). At this point, a period of downtime is allowed so that the source database will no longer have any new modifications, and the most recent modifications (since the last iteration of the incremental transfer) can be identified and transferred to the target database, at which point the entire operation is complete. Ideally, this final transfer of the remaining modifications can be completed in a relatively short period of time (e.g., 1-2 days) so that the database downtime is minimized.

As described above, before generating digital signatures and transferring the database tables in segments, the incremental data transfer system dynamically determines segmentation criteria for each of the tables in the database. The incremental data transfer system of some embodiments analyzes the columns of a table (and, in some cases, generates an additional column or columns for the table) to identify a set of optimal segmentation columns.

Figure 8:
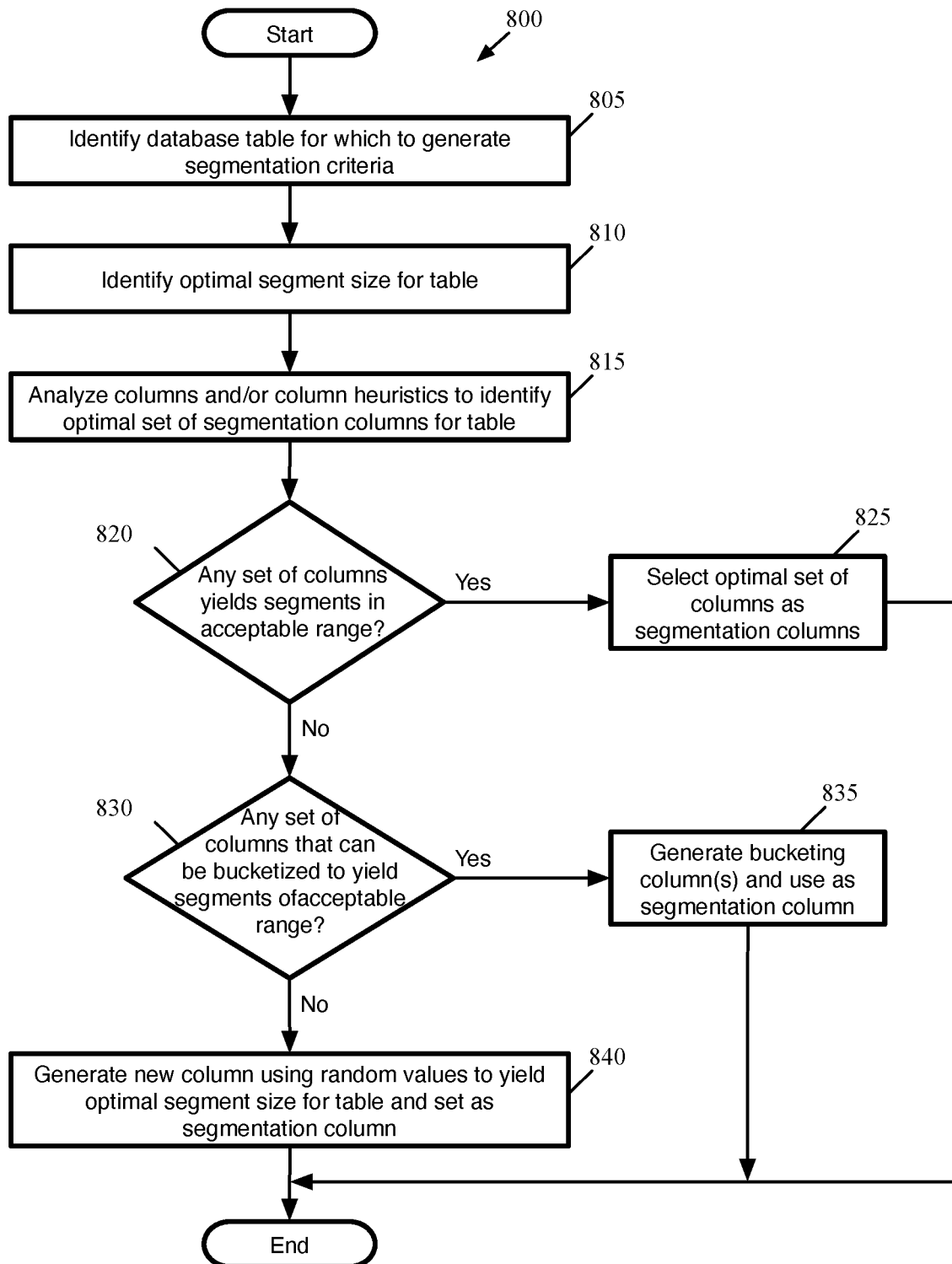
FIG. 8 conceptually illustrates a process of some embodiments for determining segmentation criteria for a database table.

FIG. 8 conceptually illustrates a process 800 of some embodiments for determining segmentation criteria for a database table. In some embodiments, the incremental data transfer system (e.g., the table segmentation analyzer) performs this process for each table in the source database prior to beginning the digital signature generation and data transfer process. The process 800 will be described in part by reference to FIGS. 9-11, which illustrate examples of a segmentation configuration table as well as the selection and/or generation of segmentation columns for various database tables.

As shown, the process 800 begins by identifying (at 805) a database table for which to generate segmentation criteria. As mentioned, some embodiments generate segmentation criteria for all of the tables in the source database. The process 800 may be performed in parallel for numerous database tables or the tables can be selected in a random or pre-specified order in different embodiments.

The process 800 then identifies (at 810) an optimal segment size for the table. In addition, some embodiments define a range of acceptable segment size (e.g., average segment size) around this optimal segment size. In general, larger data segments (and therefore fewer segments in a table) provide the advantage of having fewer digital signature computations and stored digital signatures, but require larger data transfers for a single modification to the source database. Correspondingly, smaller data segments make it easier to transfer a given segment, but require more digital signature computation/storage.

Different embodiments determine the optimal segment size for a table in different ways. Some embodiments use a fixed percentage of the database table as the optimal average segment size (e.g., one tenth, one fiftieth, etc.). Other embodiments have an optimal size set for all tables (e.g., 500 MB), such that the optimal number of rows for a segment varies from table to table (depending on the number of bits required for each row of the table). In this case, the optimal number of segments will also vary from table to table. Still other embodiments use a more complex algorithm that factors in at least some of the size of the table (in bits and/or rows), the size of the database overall, and potentially other factors. For instance, such an algorithm might opt for larger segment sizes for larger tables, but not keeping a fixed percentage (e.g., having an optimal size of 200 MB for a 50 GB table and an optimal size of 1 GB for a 1 TB table). In addition, some embodiments may also factor in the bandwidth of the connection between the source and target systems as well as other resource constraints such as the amount of allowed downtime for the final iteration of updates. For example, some embodiments use the bandwidth of the connection to determine an amount of data that can be transferred in a particular amount of time (e.g., 1 hour) and use this amount of data as an optimal segment size.

In addition, the range of acceptable average segment sizes may vary around the optimal size differently in different embodiments. Some embodiments allow a percentage of the determined optimal segment size on either side of that optimal size (e.g., 10%, such that for an optimal size of 100 MB anywhere from 90 MB to 110 MB is acceptable. Other embodiments vary this percentage based on the optimal segment size (e.g., with larger optimal segment sizes having larger allowable percentage ranges) and/or have a different range above the optimal segment size than below (e.g., allowing only 10% of the optimal size below but 25% of the optimal size above).

Next, the process 800 analyzes (at 815) the columns of the table and/or the column heuristics (e.g., histograms) to attempt to identify an optimal set of segmentation columns for the table. As mentioned, in some embodiments, databases include metadata and/or statistics for each table that includes histograms of the values in each column of the table. These histograms indicate the frequency with which each value appears in a column and/or the statistical distribution of the values within the column. In addition, some databases also include metadata for combinations of columns, or at least can be configured to do so. The data segmentation process of some embodiments, for a given table, analyzes the histograms for the columns of the table to identify the expected number of data segments and data segment size for different possible segmentation columns and/or segmentation column groups.

Different embodiments use different algorithms to search out a set of segmentation columns for a particular table. Some embodiments initially identify the optimal number of data segments for the table based on the optimal average segment size, then search for a column with that optimal number (or close to that optimal number) of different values. In addition, some embodiments require that the table have reasonably close to the same number of rows with each value in the identified column, as having one very large segment that is a majority of the table would not actually be useful. In addition, the algorithm of some embodiments examines groups of potential columns that could yield a similar result, either using data if it already exists in the database heuristics or by generating the data for combinations of columns. If historical data is available, some embodiments also factor in how often the values in each column change, as columns with less frequent value changes typically make for better segmentation columns.

Based on this analysis, the process 800 determines (at 820) whether any set of columns of the currently selected table is expected to yield data segments within the acceptable range of an optimal average segment size. If at least one column or group of columns is found that is expected to yield optimal size data segments, then the process selects (at 825) the optimal set of columns (i.e., the set of columns that is expected to give the closest data segment size to the optimal size) as the segmentation columns for the table. In some embodiments, these segmentation columns are stored in a segmentation configuration table that includes a row for each table indicating (i) the table name, (ii) the set of segmentation columns selected for the table, and (iii) the average block size expected based on the set of segmentation columns.

FIG. 9 illustrates an example of such a segmentation configuration table 900. This example has five rows for five tables T1-T5, but one of ordinary skill in the art would recognize that a typical example will have many more rows (as a typical database being transferred using this incremental data transfer method will have many more tables). The first two rows in this table indicate tables that are segmented based on the values in existing columns. T1 is segmented based on two columns A and B for a resulting average segment size of 300 MB, while T2 is segmented based on a single column C for a resulting average segment size of 100 MB. FIG. 10 illustrates an example of such a database table 1000 segmented based on two columns A and B (e.g., such as T1). In this case, using either column A or column B would only result in two data segments (which are determined to be larger than optimal), but using the combination of these columns results in four more optimally sized data segments.

If the process 800 identifies a set of existing columns of the selected database table to use as segmentation columns for that table, then the process ends. Otherwise, some embodiments use one or more additional data segmentation algorithms to create optimal segmentation columns. As shown, the process 800 determines (at 830) whether any column or set of columns can be bucketed to create an optimal segmentation column. If such a segmentation column can be generated, then the process 800 generates (at 835) this segmentation column by bucketing an existing column or group of columns and selects this generated column as the segmentation column for the table (e.g., by storing the column in the segmentation configuration table).

For example, some embodiments apply a bucketing function to columns with highly unique values (e.g., a user_id column). For instance, for a column that has unique integer values, some embodiments compute the data value modulo a desired number of data segments (determined based on the optimal segment size for the table) to generate a value used for data segmentation. This value can be stored in a newly-generated column or computed on the fly during digital signature generation in different embodiments. FIG. 9 includes two rows that use computed columns. For table T3, a new column is computed that is the user_id column (i.e., a unique integer) modulo 75. This will create 75 data segments of nearly equal size (~300 MB in this example). For table T4, a new column is computed that uses the first four characters of the values in column D. This could be a string column with values formatted such that the first four characters provides an optimal number of data segments with approximately the same size (in this case, an average of 2 GB).

If, however, the existing columns neither (i) include a set of acceptable segmentation columns nor (ii) include a set of columns that can be bucketized to generate an acceptable segmentation column, then the process 800 generates (at 840) a new column using random values to yield approximately the optimal segment size for the table, and sets this new column as the segmentation column for the table. For instance, if the optimal segment size identified for a table is approximately one fiftieth of the table, then some embodiments generate a new column with each row randomly assigned a value from 0-49, which is used as the segmentation column. In the segmentation configuration table 900 of FIG. 9, the segmentation column for table T5 is new.random.int0-99, a column in which each row is assigned a random integer in the range 0-99. In this case, the size of the table is approximately 75 GB, such that dividing the table into one hundred segments results in 750 MB segments.

Figure 11:
FIG. 11 illustrates an example of a database table for which a new column is generated to be used for segmentation.

FIG. 11 also illustrates an example of a database table 1100 for which this technique is used to generate a new column. As shown, the table 1100 as stored in the database includes three columns (A, B, and C), none of which have any useful repeating values or easily bucketized values. Instead, the incremental data transfer system generates a fourth column D and assigns each row a value in the range 0-3, such that the table 1100 will be divided into four data segments.

As mentioned, the incremental data transfer system of some embodiments performs this process 800 (or a similar process) for each table in the source database before the initial transfer of the database. It should be understood that the process 800 is only one possible process, and that different embodiments use different segmentation processes. For instance, different embodiments might generate a new column using random values for all of the tables in a database without attempting to find existing columns to use as segmentation columns, or use other processes to attempt to determine which existing columns to use as segmentation columns rather than analyzing the column histograms (and some databases might not store these histograms).

In addition, an administrator (e.g., that manages the data migration process) can also modify the segmentation configuration after the data segmentation process has run for the tables in the database. In some embodiments, the administrator can modify the set of segmentation columns for a given database table via editing the segmentation configuration table (i.e., the table shown in FIG. 9). For instance, if the set of segmentation columns chosen dynamically has values that often change, this may not be desired and so the administrator may select a new set of segmentation columns with more static values.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
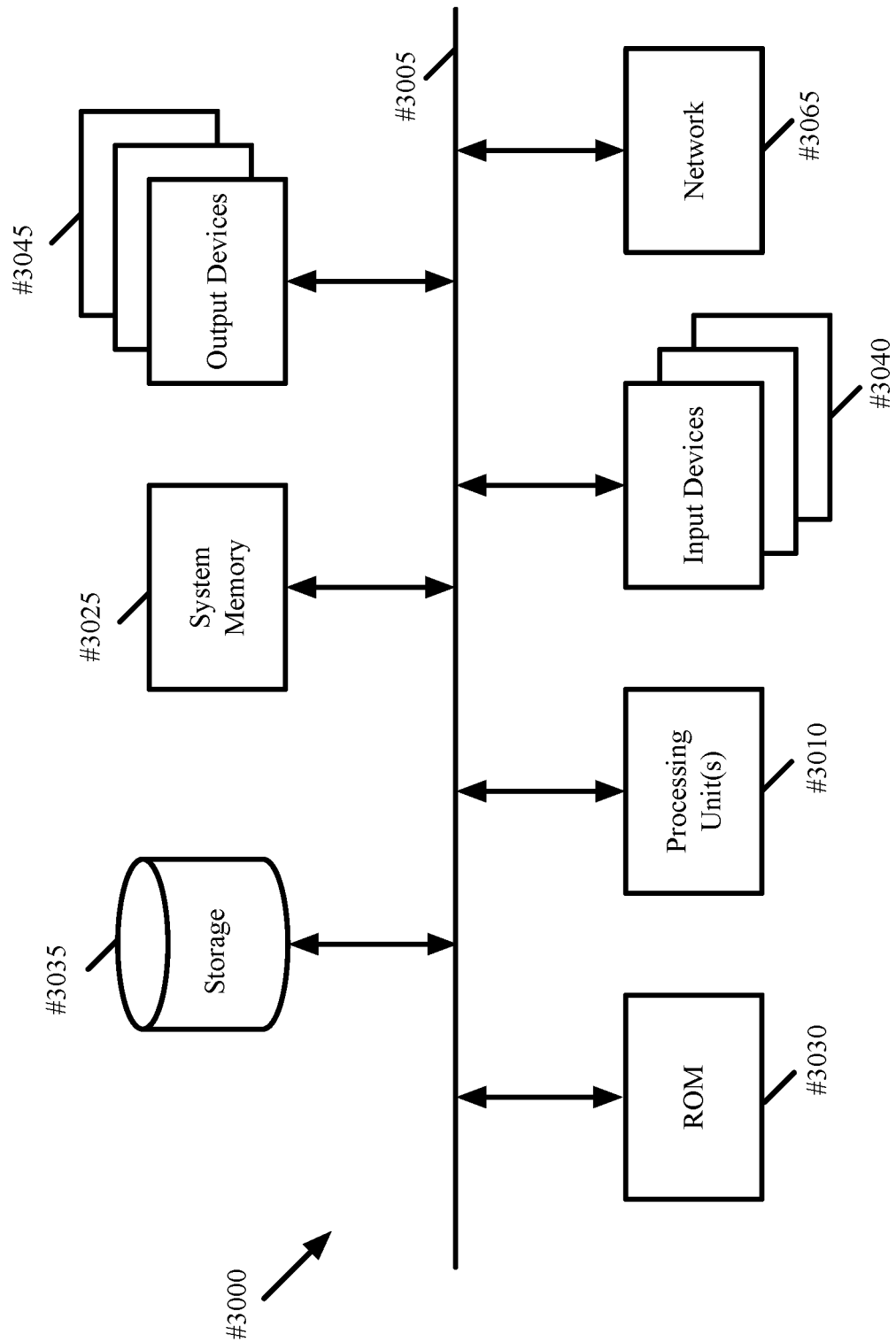
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute, e.g., the incremental data transfer system (i.e., its various modules) described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieves instructions to execute and data to process in order to execute the processes of the invention. The processing unit(s) may be a single processor or a multi-core processor in different embodiments, and may include generic CPU s as well as graphics processing units (GPUs).

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such as random-access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieves instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIGS. 3, 5, and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of migrating data from a first database to a second database, wherein the data is susceptible to change at the first database before all of the data is migrated to the second database and is available for access through the second database, the method comprising:

transferring segments of data incrementally from the first database to the second database and generating a first digital signature for each transferred segment;

identifying (i) set of transferred segments that have been modified in the first database before the data is available for access through the second database and (ii) a set of transferred segments that have not been modified by generating a second digital signature for each transferred segment in the set and comparing the second digital signature for the segments with the first digital signature for the segments, wherein the set of transferred segments that have not been modified are not transferred again;

transferring the modified segments from the first database to the second database in order to replace the previously transferred segment with the modified segment; and iteratively identifying modified segments using the digital signatures and transferring the modified segments until a determination is made that all the data has been transferred to the second database and all the segments stored in the second database now match all of the corresponding transferred segments in the first database.

2. The method of claim 1, wherein each of the transferred segments comprises a plurality of rows in a table of the database.

3. The method of claim 2, wherein a particular transferred segment comprises only a subset of the rows of a table but not all of the rows of the table.

4. The method of claim 2, wherein a first transferred segment comprises a first plurality of rows in a particular table and a second transferred segment comprises a second plurality of rows in the particular table.

5. The method of claim 4, wherein the first and second pluralities of rows do not overlap.

6. The method of claim 4, wherein each row in the first plurality of rows has a same first value for a first column of the particular table and each row in the second plurality of rows has a same second value for the first column of the particular table.

7. The method of claim 2, wherein generating the digital signature for a particular segment comprises:
generating a hash value for each row in each segment;
generating a value for the segment from the hash values for the rows of the segment.

8. The method of claim 7, wherein the value for the segment is the same irrespective of the order of the rows in the segment.

9. A non-transitory machine-readable medium storing a program which when executed by at least one processing unit migrates data from a first database to a second database, wherein the data is susceptible to change at the first database before all of the data is migrated to the second database and is available for access through the second database, the program comprising sets of instructions for:
transferring segments of data incrementally from the first database to the second database and generating a first digital signature for each transferred segment;
identifying (i) set of transferred segments that have been modified in the first database before the data is available for access through the second database and (ii) a set of transferred segments that have not been modified by generating a second digital signature for each transferred segment in the set and comparing the second digital signature for the segments with the first digital signature for the segments, wherein the set of transferred segments that have not been modified are not transferred again;
transferring the modified segments from the first database to the second database in order to replace the previously transferred segment with the modified segment; and
iteratively identifying modified segments using the digital signatures and transferring the modified segments until a determination is made that all the data has been transferred to the second database and all the segments stored in the second database now match all of the corresponding transferred segments in the first database.

10. The non-transitory machine-readable medium of claim 9, wherein each of the transferred segments comprises a plurality of rows in a table of the database.

11. The non-transitory machine-readable medium of claim 10, wherein a particular transferred segment comprises only a subset of the rows of a table but not all of the rows of the table.

12. The non-transitory machine-readable medium of claim 10, wherein a first transferred segment comprises a first plurality of rows in a particular table and a second transferred segment comprises a second plurality of rows in the particular table.

13. The non-transitory machine-readable medium of claim 12, wherein each row in the first plurality of rows has a same first value for a first column of the particular table and each row in the second plurality of rows has a same second value for the first column of the particular table.

14. The non-transitory machine-readable medium of claim 10, wherein the set of instructions for generating the digital signature for a particular segment comprises sets of instructions for:
generating a hash value for each row in each segment;
generating a value for the segment from the hash values for the rows of the segment.

15. The non-transitory machine-readable medium of claim 14, wherein the value for the segment is the same irrespective of the order of the rows in the segment.

\* \* \* \* \*